United States Patent [19]

Sampson

[11] Patent Number: 6,131,122
[45] Date of Patent: Oct. 10, 2000

[54] PROGRAMMABLE INTERNET AUTOMATION

[75] Inventor: Oliver Richard Sampson, Raleigh, N.C.

[73] Assignee: Nortel Networks Corporation, Canada

[21] Appl. No.: 09/088,393

[22] Filed: Jun. 1, 1998

[51] Int. Cl.[7] .............................. G06F 13/38; G06F 15/17
[52] U.S. Cl. ........................ 709/227; 709/217; 709/219; 709/235; 709/209; 707/10
[58] Field of Search .................................. 709/219, 217, 709/227, 231, 206, 235, 101, 241, 203; 707/10; 370/432; 379/114, 115; 348/1, 2, 3, 7, 12, 13; 455/5.1

[56] References Cited

U.S. PATENT DOCUMENTS

| | | | |
|---|---|---|---|
| 5,822,543 | 10/1998 | Dunn et al. ............................... | 709/224 |
| 5,832,231 | 11/1998 | Raman et al. ............................ | 709/234 |
| 5,832,287 | 11/1998 | Atalla ...................................... | 395/800 |
| 5,862,339 | 1/1999 | Bonnaure et al. ........................ | 709/227 |
| 5,913,039 | 6/1999 | Nakamura et al. ...................... | 709/231 |
| 5,923,846 | 7/1999 | Gage et al. .............................. | 709/213 |
| 5,944,786 | 8/1999 | Quinn ...................................... | 709/206 |
| 5,978,381 | 11/1999 | Perlman et al. ......................... | 370/432 |
| 5,978,833 | 11/1999 | Pashley et al. .......................... | 709/200 |
| 5,991,760 | 11/1999 | Guavin et al. ........................... | 707/10 |

FOREIGN PATENT DOCUMENTS

0181503B3  5/1986  European Pat. Off. ........ G06F 15/40

OTHER PUBLICATIONS

Utility answers the electronic–mail call by automatically checking messages; computer program; evaluation, Ray, Garry, PC Week vol. 3; p. 105, total 4 pages, Jun. 17, 1986.

Accessing messages automatically; software for CompuServe's forum message bases, Simon, Barry, PC Magazine vol. 6; p. 254, total 4 pages, May 12, 1987.

Low cost, High speed Modem, Lewallen, Dale, PC–Computing vol. 5, p. 156, total 8 pages, Apr. 1992.

*Primary Examiner*—Zarni Maung
*Assistant Examiner*—Bunjob Jaroenchonwanit

[57] ABSTRACT

Computer programming for use with the PC of an on-line data access user and with the host computer of an on-line data access provider or file server. After dialing the host point of presence through a telecommunication switch and logging onto the host computer, the user uploads a batch of queries to the host computer. After uploading the queries, the user logs off of the host computer and terminates the switched connection. When the host computer has accumulated the last response to the user's batch of queries, the host computer dials the user and downloads the responses after an optional log-on sequence. Alternatively, the host computer holds the responses until the user again dials the host computer's point of presence and logs onto the host computer and requests download of the responses.

19 Claims, 4 Drawing Sheets

PROGRAMMABLE INTERNET AUTOMATION

FIELD OF THE INVENTION

The present invention relates to a method and means for avoiding the long idle times experienced by telecommunication switched connections that are endemic with digital transmission of queries and data responses, generally through on-line service providers, usually internet service providers of various types (generically, "ISP" s), and more specifically to remove the telecommunication switching instrumentality from between the user and the ISP during expected long idle periods.

BACKGROUND OF THE INVENTION

There has been a rapid increase in the use of on-line data service providers, especially internet or intranet service providers. Such use has caused a sharp increase in telecommunication connect times—time during which a telecommunication connection is maintained though a telecommunication switching instrumentality or central office switch—from a user's personal computer (PC) to an ISP. Such telecommunication connections are usually placed on the Public Switched Telephone Network (PSTN). Such long connect times have increased to the point at which degradation in the telephone and telecommunication services provided to the general public has become noticeable. Local telephone companies must maintain a reasonable level of service in accordance with mandates from the Federal Communications Commission (FCC) and the several state utilities commissions. Similar situations are arising or will arise anywhere in the world.

A large part of the technological and managerial frustration with the long connect times through the PSTN switches is due to the fact that an enormous portion of that connect time between the on-line users and their ISPs is idle time. Such idle time usually occurs after the user has placed a query through the user's ISP and is waiting for a response from the on-line service provider's database or from a remote internet server or internet presence. Such long periods of delay between the placing of a query and its response mandates that a part of the PSTN switch that serves the user must be "tied up" and unavailable to serve other telecommunications customers during the inevitable long idle periods during which the connection between the user and the ISP must be maintained but carries no genuine traffic). Such telecommunication connections are usually from the user to a local point of presence (POP) of the ISP and thus do not yield such toll revenues to the local telephone company as would justify such protracted use of a switched connection merely to maintain that connection in an idle state.

Maintaining desirably prompt service levels to all telecommunications users is thus necessitating the installation of what might be considered excessive switching capacity in the PSTN. Failure to keep pace to increase the capacity to handle telecommunications traffic can inconvenience all users of the PSTN; because, that inefficient use of the PSTN degrades the ability of everyone to make telephone and other telecommunication calls. Also, enhancement of the PSTN to accommodate increased idle time increases cost to the Local PSTN Carriers, which eventually leads to increased cost to all telecommunication end users.

A large portion of the time that a user is logged into an ISP is spent either waiting for a response from an ISP's local POP or is spent reviewing "on line" information gathered from a remote server. If this user-waiting time can be eliminated or seriously reduced, both the PSTN carriers and the general telecommunications-using public will be much better served.

One way of minimizing idling lines on the PSTN is to identify telecommunications connections that are intended for an on-line service provider or other data server and switching, diverting or off-loading such calls from the PSTN switching instrumentality to a dedicated data network which is associated with the PSTN. Exemplary solutions are disclosed in a co-owned, copending U.S. patent application Ser. No. 08/980,534, filed on Dec. 1, 1997, in the names of Shou-Huey Jiang, et al. and in another co-owned, copending U.S. patent application Ser. No. 08/982,155, filed on Dec. 1, 1997, in the names of William G. Fair, et al. Another such solution is disclosed in still another co-owned, copending U.S. patent application Ser. No. 08/990,941, filed on Dec. 15, 1997, in the names of Sridhar Rao, et al.

SUMMARY OF THE INVENTION

According to one aspect of the present invention the problem is solved simply and inexpensively by providing programming at both the ISP computer and at the user's computer. This programming allows the user to batch-upload data-service and internet queries to the ISP computer. At the end of the batch uploading operation, the switched connection between the user's PC and the ISP's POP is released. When the ISP has accumulated responses to all of the user's requests, and when those responses are available at the ISP's POP, the PSTN's local switching instrumentality establishes a new connection between the ISP and the user's. The responses are then downloaded to the user's PC, preferably for off-line review by the user. Therefore, while the ISP is accumulating the responses to the user's queries, the PSTN's local switching instrumentality is not maintaining a switched connection between the user and the ISP's local POP and can use that switching capability for its other subscribers or customers.

In accordance with another aspect of the present invention, computer programming causes a data access user's computer to send one or more data queries on a telecommunication connection through a switching office to a data access service provider's computer and signals to the service provider's computer when the last query is sent, logging off of the service provider's computer and ending the telecommunication connection.

In accordance with still another aspect of the present invention, computer programming causes a data access service provider's computer to receive data queries from a user and process queries, recognizing that the last query has been received and logging the user off of the service provider's computer, recognizing that responses are available for the user's queries, and then downloading those responses to the user in response to a logged-on condition of the user.

BRIEF DESCRIPTION OF THE DRAWINGS

A more complete understanding of the present invention will be had from the following detailed description when considered in connection with the accompanying drawings, wherein the same reference numbers refer to the same or corresponding items shown throughout the several figures, in which.

DETAILED DESCRIPTION AND PRACTICAL APPLICATION

Figure 1:
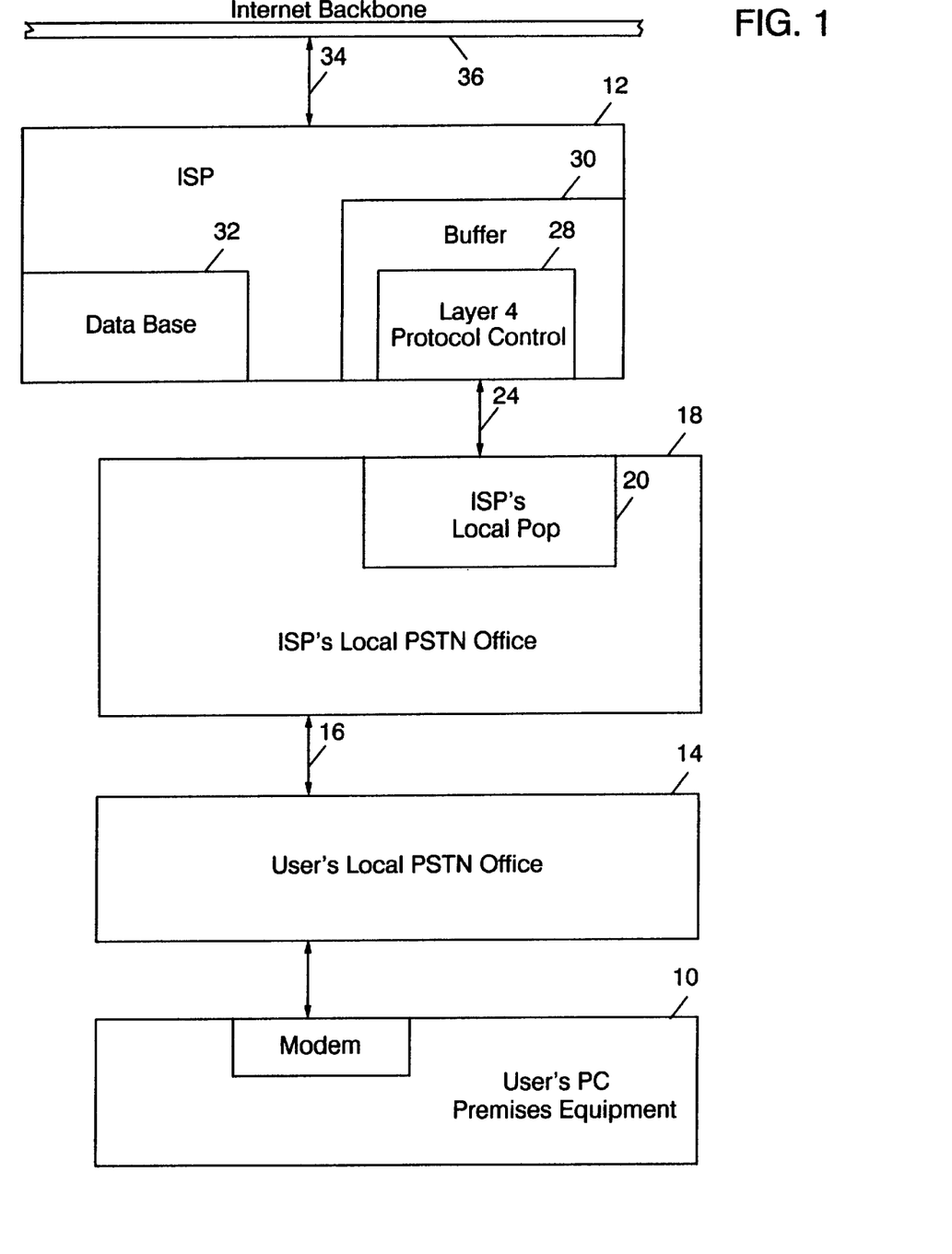
FIG. 1 is a schematic illustration of the typical interconnection between a user's PC and an ISP computer.

Referring now to the drawings and particularly to FIG. 1, there is shown an illustration of an interconnection between a data service user's premises equipment, usually a personal computer (PC) 10 and a data and/or internet service provider's host computer (ISP) 12. The ISP host computer or some other file or data server host computer 12 is usually connected to its users' PCs 10 through one or more local or trunk switches of the PSTN.

The user's PC 10 will have either a modem to convert between the PC's digital signals and the tone signals that the user's local office 14 of the public switched telephone network (PSTN) is equipped to handle. There will usually be a two-wire, twisted pair voice line extending from the local switching office 14 to the user's PC 10. Alternatively, the user's PC 10 and the local PSTN office 14 can be linked by an integrated services digital network interconnection (ISDN).

The user's local switching office 14 is connected by an interoffice trunk 16 to another PSTN switching office 18 which has the ISP's point of presence (POP) 20 that is local to the user. The inter-office trunk 16 can include any number of intermediate or toll offices; so that, the two local switching offices 14 and 18 need not be directly connected to each other. The service provider or ISP host computer 12 is typically connected to each of its POPs by a data link 24.

The ISP host 12 is usually connected to its POPs 20 through a protocol control element 28, which is part of an input/output buffer 30. The ISP host 12 also includes its own database 32 for making data available to its users and also to store links to other, contract database providers that the ISP provides for its users. Additionally, the ISP host 12 preferably has a direct data link 34 to an intranet system, a form of internetworking system, or to the well-known Internet backbone 36.

Figure 2:
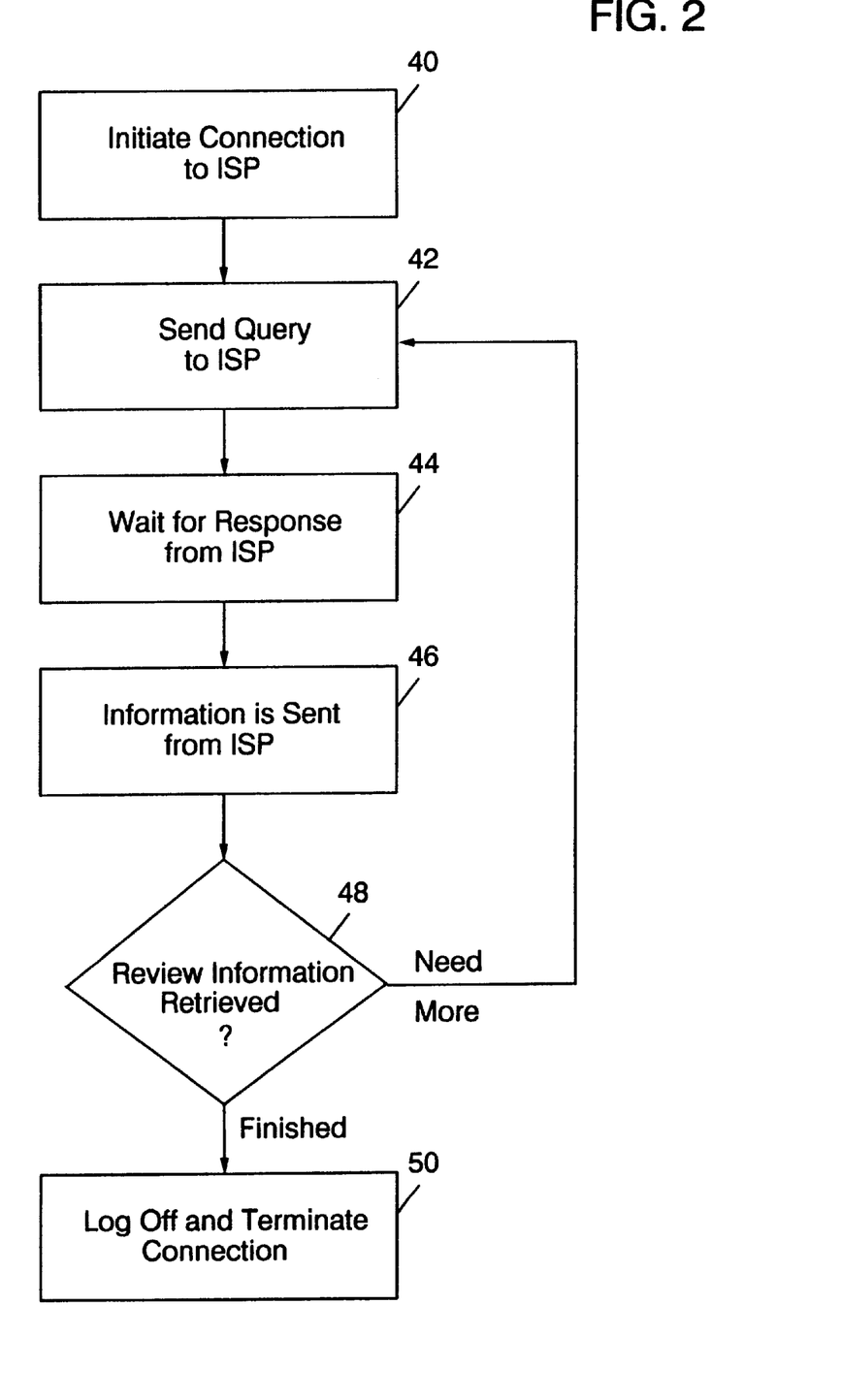
FIG. 2 is a flow chart of a typical interaction between a user and an on-line server's database or a remote internet server or presence.

Referring now to FIG. 2, a flow chart is shown which illustrates the typical interaction between a user's PC 10 (of FIG. 1) and an on-line server's database or a remote internet server or presence, i.e., the ISP host 12.

In the first step 40, the user initiates a connection to the ISP 12. This is most usually done by using the PC 10's modem to close a switch to send an "off hook" condition to the user's local switching office 14. The local office 14 sends a dial tone to the user's modem. The PC 10 conventionally causes the modem to send the appropriate dialing digits to the local switch 14 to "dial up" the ISP's local POP. The PSTN then interconnects the user's PC 10 with the ISP's POP in the same manner as the PSTN would conventionally connect a telephone subscriber at location A to another telephone subscriber at location B.

After the user's PC 10 and the ISP host computer 12 have been linked and synchronized, the host computer 12 asks the PC 10 for a log-in alias and a password. The user sends both, in turn, to the host 12 and is then granted access.

In step 42, the user sends a query to the ISP host 12, asking for some information. This query can be formulated by the user in advance of logging onto the host 12 or can be formulated "on line."

However, after sending the query to the host 12, the user waits, in a step 44, for a response from the ISP 12 in answer to the query. This wait can be very brief if the query can be answered from the host's own database 32 (FIG. 1). Or, this wait can be quite protracted if the ISP 12 must forward the query over the internet backbone 36 to some remote and perhaps very busy database present on the internet.

After a wait of perhaps seemingly interminable duration, the ISP receives the information requested and forwards it to the user at a step 46. During this wait, the PSTN has maintained a viable connection between the user and the ISP through typically two switching offices 14 and 18 and through a trunk connection on the trunk 16. This ties up PSTN capacity for no useful purpose other than to "hold the line," as that term is used by human telephone subscribers when one person has to leave the telephone to search for and fetch something, return with it to the telephone, and then proceed with the conversation.

In the next step 48, the user then reviews the received information. This is another period when the connection between the user 10 and the ISP 12 is idle while the user considers the received information and decides if he has enough or if he needs more. If the user needs more information, he has a choice of logging off of the ISP host 12 and formulating his follow-on query or formulating his follow-on query while still on line.

The step 48 is actually a decision step. If the user decides that he has enough information or if he decides to supplement his query off line, he is finished with his current on-line session and then logs off of the ISP and its host computer 12 in a final step 50.

Alternatively, if the user decides that he needs further information and decides to supplement his query on line, the step 48 reverts to the step 42 at which the supplemental query is sent to the ISP. The user then waits again in the step 44 for a further response from the ISP 12. The supplemental information is sent to the user at the step 46, and the user reviews this supplemental information in the step 48.

What can really exacerbate the waiting and extend the on-line idle condition is if the user sends multiple queries to the ISP. The responses and the supplemental queries can become jumbled and confused in the user's mind as he reviews each and tries to juggle them on line and yet minimize on-line time.

Figure 3:
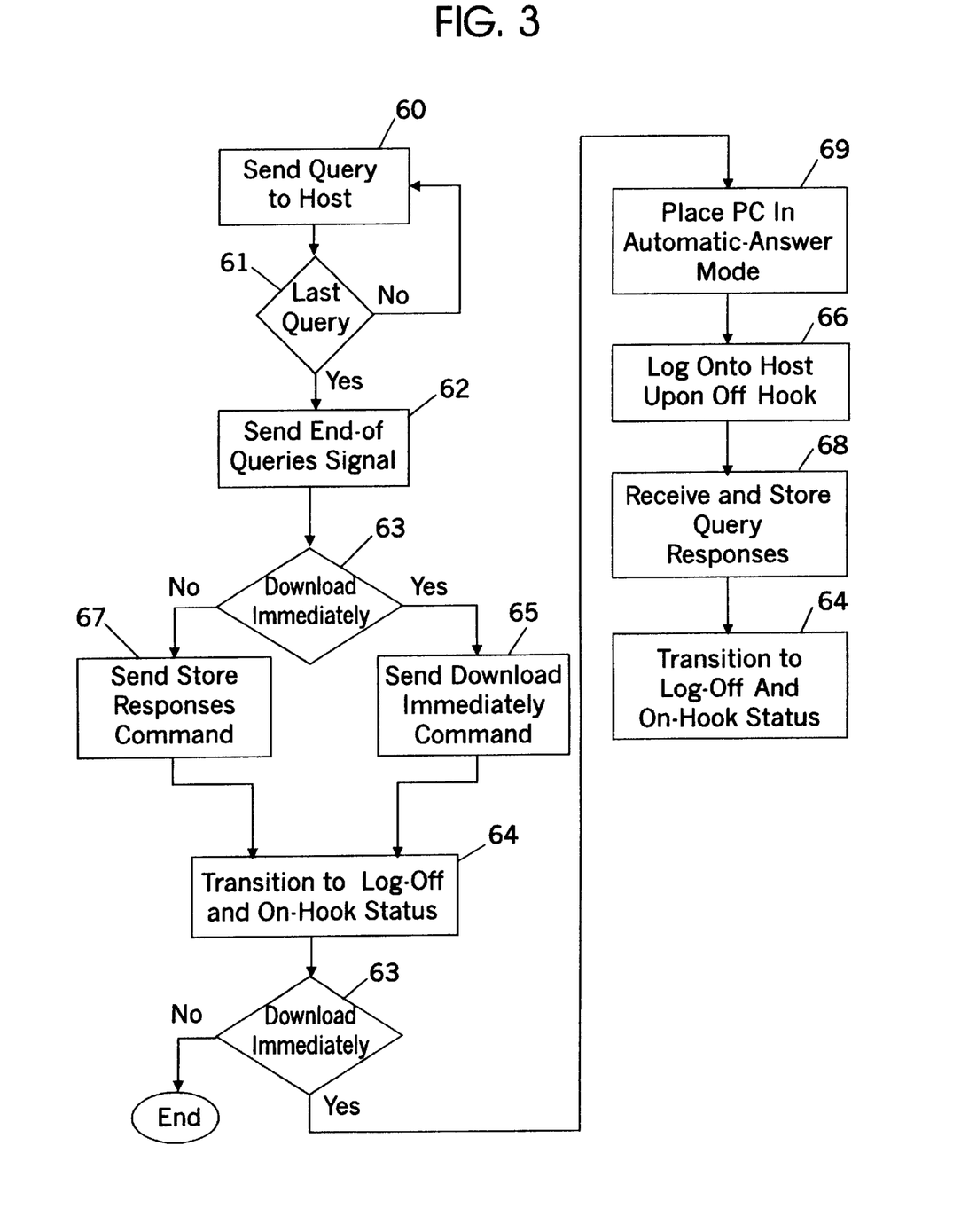
FIG. 3 is a flow chart of the interaction, from the standpoint of the user, according to the preferred embodiment of the present invention, between a user's PC and an ISP computer in order to upload a series of user queries and download responses to those queries.

Referring now to FIG. 3 a flow chart is shown of the interaction, according to the preferred embodiment of the present invention, between a user's PC 10 (FIG. 1) and an ISP host computer 12 in order to upload one or more of user's queries. At the first program step 60, the user's computer, already logged onto the ISP host computer 12, sends a query to the ISP host.

In the next, decision program step 61, the user's PC 10 decides if it has another query to upload or if this is the last query. If "yes," there is another query to upload, the program returns to the program step 60 to upload that next query. This process is repeated as long as the user's PC 10 has more queries to upload. After the last query has been uploaded, the decision program step 61 finds that "no," there are no more queries to be uploaded and advances the program to the next program step 62.

In the next program step 62, the User's PC 10 sends an end-of-queries message to the ISP host computer, indicating to the ISP host computer 12 that the last query has been sent.

In the next, decision program step 63, the program ascertains whether the user has indicated that the host computer 12 is to download all responses to the user's queries as soon as all of the responses have been accumulated by the host computer. If "yes," the user has indicated that all responses are to be downloaded as soon as they all have been accumulated by the host computer 12, the program proceeds to the program step 65 which causes the user's computer or PC 10 to send a signal to the host computer 12 instructing the host computer to reestablish the connection to the user PC 10 and download all of the responses as soon as they have all been accumulated by the host computer 12.

If the answer to the decision program step 63 is "no," the user does not want all responses downloaded as soon as they have all been accumulated by the host computer, the program advances to the program step 67 which instructs the host computer 12 to hold and store the responses and await the user's request for a download.

From either of the program steps 65 and 67, the program progresses to a step 64. The program step 64 causes the user's computer or PC 10 to log off of the ISP host computer 12 and then sends an on-hook condition to the PSTN switch, in order to terminate the connection between the user and the ISP. The ISP now continues its processing of the query or queries and obtains and stores the responses.

Alternatively, each query can, but need not, include a digital flag to indicate to the host computer 12 that the host is to download, to the user PC 10, a response to that query as soon as the host has that response available. That is, the host downloads the response to that flagged query on a priority basis without waiting for responses to all of the other queries that were sent in the user's same log-on session. The responses to any queries that are not so flagged will be accumulated by the host for downloading together at a later reconnect of the user PC 10 and the host computer 12. As another alternative, if responses to a few of the other, unflagged queries are already available when the response to the flagged query is available, the other available responses can be downloaded along with the response to the flagged query.

As soon as the user computer or PC 10 goes on-hook, it revisits the decision step 63 to ascertain if the user has commanded the PC 10 to wait for the host to initiate a reconnection with the PC in order to download the responses. The host will then initiate reconnection as soon as the host has accumulated responses to all of the user's queries. If the answer to the decision step 63 is "yes," the program advances to the next program step 69 and places the PC 10 in the automatic-answer mode. In the automatic answer mode, the PC 10 monitors its telecommunications line or "drop" from the PSTN switch for a "ring" signal, at which point, the PC 10 will go off-hook and try to synchronize with whatever computer has dialed it up. Presumably that computer will be the ISP host computer 12.

If, after the PC 10 goes on-hook, the answer to the revisited decision step 63 is "no," the program ends; and the PC 10 awaits the user's pleasure.

When the ISP host computer 12 has accumulated all of the responses to the user's queries, it preferably calls the user back, on the PSTN, provided that it has been so instructed by the program step 65. Meanwhile, the user's PC 10 has been in the "automatic answer" mode as a result of the program step 69, waiting for a call from the ISP host computer 12.

As described above, during the upload session, the user can enter into any query, a digital flag indicating to the host computer 12 that a response to that query is to be downloaded as soon as the host has that particular response available. If a query has such a flag, a signal is sent to the auto-answer step 69 to place the PC 10 in the auto-answer mode upon logging off, even if the revisited decision step 63 has decided not to place the PC 10 in the auto-answer mode.

In the next program step 66, the user's PC 10 goes off hook in response to the ring signal from the ISP's call, thereby answering the call from the ISP. Upon completing the PSTN telecommunication connection between the user's PC 10 and the ISP host computer 12, the PC and the host computer synchronize and complete a log-on procedure to complete their "handshake." Alternatively, the ISP can waive or forego the complete log-on procedure, assuming that since the ISP placed the call, the responding computer is actually the user's PC 10. As another alternative, the ISP host computer 12 may merely ask for the user's log-on alias, which is often preprogrammed into user computers, leaving the password for manual entry during the log-on operation.

After completion of the log-on operation, whether done automatically in response to the ISP dialing the user or by the user initiating a log-on at his own pleasure, the ISP host computer 12 downloads the responses to the user's PC 10 either in the program step 68 or as a completely separate transaction. The user's PC 10 stores those responses in the existing memory of the PC, for the user's use. After completion of the downloading of the responses, the user's PC 10, if operating in the automatic-answer mode, revisits the program step 64 and logs off of the ISP host computer and goes on hook. Alternatively, the user can have prepared more queries and instructed the program to upload such additional queries, starting the program over again at the program step 60, the progression from the revisited program step 64 to the program step 60 not being shown as it is wholly under the user's command and control.

Figure 4:
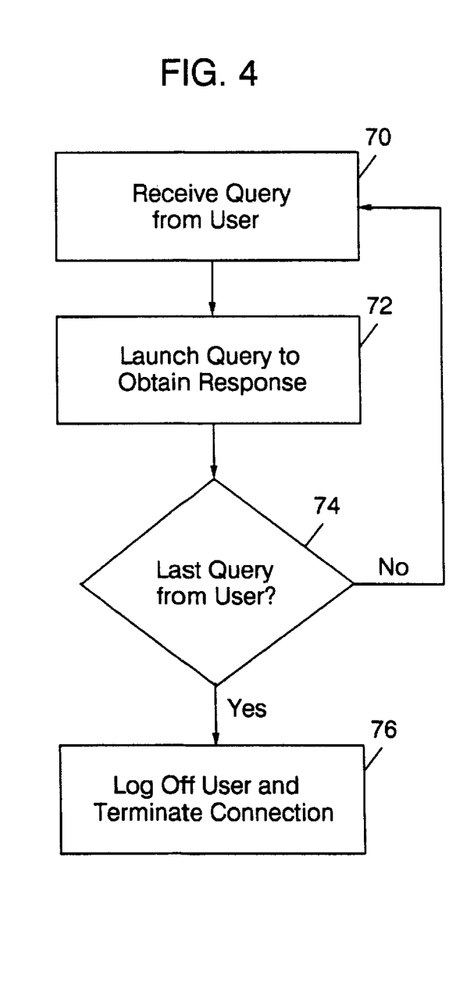
FIG. 4 is a flow chart of the interaction, from the standpoint of the ISP, according to the preferred embodiment of the present invention, between a user and an ISP computer in order to upload a series of queries from the user.

Referring now to FIG. 4, a flow chart is shown, from the standpoint of the ISP, of the preferred embodiment of the present invention, illustrating part of the interaction between the ISP 12 and the user 10. FIG. 4 shows the program steps performed by the ISP in order to upload a series of queries from the user.

In the first program step 70, once the user has been completely logged onto the ISP host computer 12 (FIG. 1), the ISP receives a query from the user's PC 10. The ISP immediately proceeds to the next program step 72 and launches the query in order to obtain the information sought by the user. That launch of the query might be to the ISP's own database or to some other database anywhere on the internet or elsewhere. The ISP does not wait for a response to that launched query.

In the next, decision program step 74, the ISP host computer 12 decides if it has received a last-query or end-of-queries signal from the user. See program step 62 of FIG. 3. If "no," the program step 74 returns the program to the receive query step 70 for the next query from the user. If "yes," the program proceeds to the program step 76, at which the user is logged off of the ISP host computer 12 and the ISP terminates the connection by sending an on-hook condition to its PSTN switch 18. This can be normal log-off routine of the ISP. The ISP then proceeds to the program steps of FIG. 5

Figure 5:
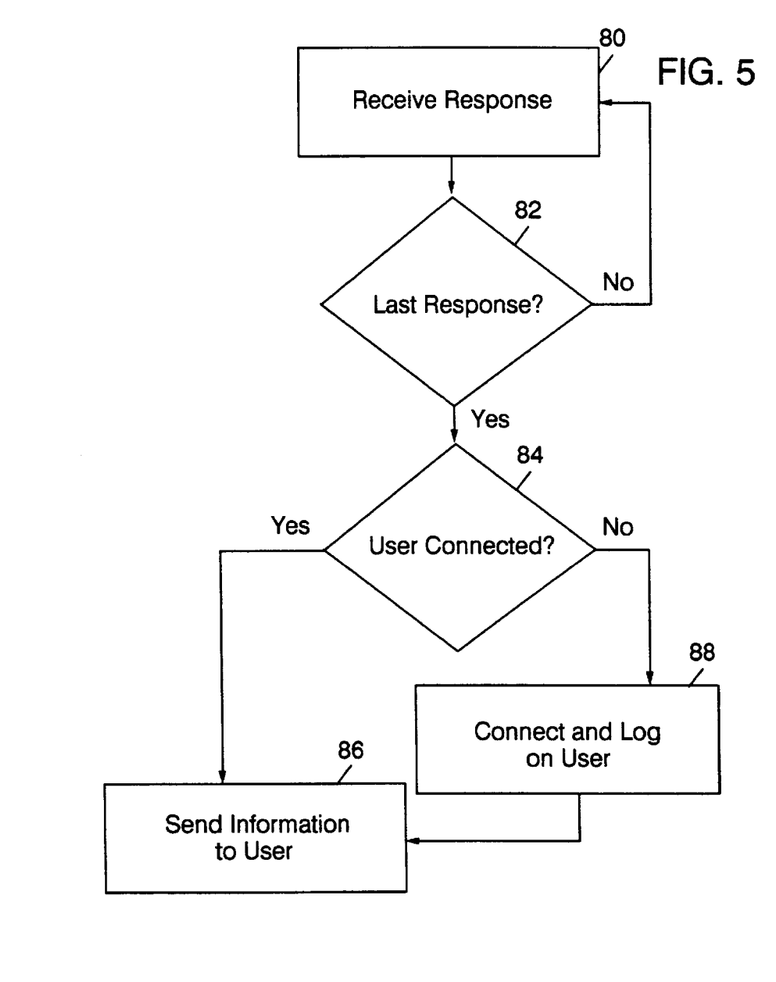
FIG. 5 is a flow chart of the interaction, from the standpoint of the ISP, according to the preferred embodiment of the present invention, between a user and an ISP computer in order to download to the user the responses to the queries received from the user.

Referring now to FIG. 5, a flow chart illustrates part of the preferred embodiment of the present invention, showing the interaction between the ISP 12 and the user 10, from the standpoint of the ISP, of the steps of downloading to the user the responses to the queries received from the user.

In the first program step 80 of FIG. 5, the ISP host computer 12 receives and routinely stores a response to one of the user's queries. The program then advances to the next, decision step 82 to decide if this is the response to the all of the user's queries, i.e., have all of the user's queries now been answered in some way? If "no," there is still at least one query for which there is no response, the program step 82 returns the program to the step 80 to await receipt of another response for this user.

If the answer to the question of program step 82 is now "yes," this is the response to the last of the user's queries, the program advances to the next, decision step 84. In the decision step 84, the program determines if the user is still connected and logged onto the ISP host computer 12. If the answer to the decision step 84 is "yes," the program advances to the next program step 86 and downloads the responses to the user.

As described above, during the upload session, the user can enter into any query, a digital flag indicating to the host computer 12 that a response to that query is to be downloaded as soon as the host has that particular response available. If a query has such a flag, as soon as a response to that query is available, the host computer 12 proceeds directly to the decision step 84 of FIG. 5 and proceeds to download the response to the user.

If the answer to the decision step 84 is "no," the user is not still logged onto the ISP host computer 12, the program advances to the next program step 88 at which the ISP sends signals to the PSTN switch 18 to dial the user's PC 10. Once the user's PC 10 answers and the host 12 and the user's PC are synchronized, the user logs onto the ISP host computer 12. Once the user's PC is logged onto the host computer 12, the program advances to the program step 86; and the responses are downloaded to the user's PC.

A provision can easily be incorporated into the host computer's programming to recognize that responses to one or more of the queries are overdue, by reason of an arbitrary delay. Once the period of the delay has exceeded the arbitrary threshold, the host computer 12 decides that it has all of the responses that it is going to get. It then proceeds to prepare itself to download all of the responses that it has actually accumulated for the user. Should a tardy response later become available, it can be downloaded at either the host computer's initiative or at the user's next log-on session, whichever had originally been requested by the user.

The computer program steps illustrated in FIGS. 3, 4, and 5 are shown in the form of program flow diagrams for ease of understanding by a person having ordinary skill in the art to which the present invention relates. The program code represented by the several program steps of FIG. 3 would ordinarily be written in a programming language appropriate to the operating system used on the PC 10 and would have to be written so as to reflect the nature of the communication program with which the PC 10 communicates with the ISP host computer 12. Similarly, the program steps illustrated in FIGS. 4 and 5 would be written in a programming language appropriate for the operating system of the ISP host computer's operating system and to reflect the nature of the various programs used by the host computer to communicate with its users, interrogate its own database, query its contract databases, and communicate with other databases on the internet and elsewhere. Such routine coding would be well within the capability of a person having ordinary skill in the art of computer programming and familiarity with the other programs with which the program code of the present invention would have to function.

While the form of the method and program steps herein described constitute a preferred embodiment of the present invention, it is to be understood that the invention is not limited to this precise form of method and program steps, and that changes may be made therein without departing from the scope of the invention which is defined in the appended claims.

I claim:

1. A computer program product for use with a public telecommunications Switched network switching office having access to a point of presence of a data service provider having a data access host computer and having access to a user of the data service having a user computer, for minimizing the connect time between the point of presence of the data service provider and the data service user, the computer program product having a medium at the host computer with at least a portion of the computer program code embodied therein and a medium having another portion of the computer program code embodied therein for distribution to users, the computer program code comprising:

computer program code for causing the user computer to send data queries through the telecommunications switching office and the point of presence of the data service provider to the host computer of the data service provider;

computer program code for causing the data service provider host computer to receive data queries from the user;

computer program code for causing the user computer to signal to the data service host computer that the user has sent the last query to the data service provider;

computer program code for initiating a logged-off condition upon the user computer's signal that the last query has been sent to the data Service provider;

computer program code for initiating an on-hook condition upon the establishment of the logged-off condition;

computer program code for causing the processing of the queries from the user;

computer program code for recognizing that responses have been received from the user queries;

computer program code, responsive to recognition that responses have been received from the user queries, for producing an off-hook condition at the user computer computer program code, responsive to off-hook condition at the user computer for re-establishing a log-on condition of the user computer;

computer program code, responsive to a log-on condition of the user computer for transmitting the responses to the user; and computer program code, responsive to transmission to the user of the last query response, for initiating a log-off condition of the user.

2. A computer program product for use by a data service user with access to a public telecommunications switched network switching office having access to a local point of presence of a data service provider having a data access host computer, the user of the data service having a user computer, for minimizing the connect time between the local point of presence of the data service provider and the data service user, the computer program product having a medium with the computer program code embodied therein, the computer program code comprising:

computer program code for causing the user computer to send data queries through the telecommunications switching office and the local point of presence of the data service provider to the computer of the data service provider;

computer program code for causing the user computer to signal to the data service computer that the user has sent the last query to the data service provider;

computer program code, responsive to transmission by the user of the last query, for processing a log-off condition of the user; and     computer program code for initiating an on-hook condition upon completion of the log-off process.

3. A computer program product according to claim 2, further comprising computer program code for indicating to the host computer to automatically download responses to the user computer when the host computer has accumulated responses to the user's queries.

4. A computer program product according to claim 3, further comprising computer program code for placing the user computer in the auto-answer mode.

5. A computer program product according to claim 4, further comprising computer program code, responsive the initiation of an off-hook condition of the user computer, for processing a log-on condition of the user computer to the data service provider host computer.

6. A computer program product according to claim 5, further comprising computer program code, responsive to completion of the processing of a log-on condition of the user computer to the data service provider host computer, for downloading responses to the user's queries.

7. A computer program product according to claim 6, further comprising computer program code, responsive to receipt by the user of the last query response, for selectively processing a log-off condition of the user.

8. A computer program product according to claim 2, further comprising computer program code for indicating to the host computer to hold responses when the host computer has accumulated the responses to the user's queries.

9. A computer program product according to claim 8 wherein the off-hook condition is responsive to the user's initiation.

10. A computer program product for use by a data service provider with a data access host computer with a point of presence at a public telecommunications switched network switching office having access to a user of the data service having a user computer, for minimizing the connect time between the local point of presence of the data service provider and the data service user, the computer program product having a medium with the computer program code embodied therein, the computer program code comprising:

computer program code for causing the data service provider host computer to receive data queries from the user;

computer program code for causing the processing of the queries from the user;

computer program code for recognizing a last-query signal from the user and logging the user off from access to the data service provider's computer;

computer program code for recognizing that responses are available for the user queries; and     computer program code, responsive to recognition of a logged-on condition of the user, for transmitting the responses to the user.

11. A computer program product according to claim 10, further comprising computer program code, for re-establishing a log-on condition of the user after responses have been received from the user queries.

12. A computer program product according to claim 11, further comprising computer program code, activated by command from the user, for dialing to reestablish a switched telecommunication connection with the user after responses have been received from the user queries and prior to re-establishment of a log-on condition of the user.

13. A computer program product according to claim 12, further comprising computer program code, for confirming the true identity of the user without the full log-on procedure prior to re-establishing a log-on condition of the user.

14. A computer program product according to claim 12, further comprising computer program code, responsive to recognition that responses have been received from the user queries, for producing an off-hook condition at the user computer prior to re-establishing a log-on condition of the user and transmitting the responses to the user.

15. A computer program product according to claim 14, further comprising computer program code, responsive to completion of transmission to the user of the last query response, for initiating a log-off condition of the user.

16. A method for use by a data service user with access to a public telecommunications switched network switching office having access to a local point of presence of a data service provider having a data access host computer, the user of the data service having a user computer, for minimizing the connect time between the local point of presence of the data service provider and the data service user, the method comprising:

causing the user computer to send data queries through the telecommunications switching office and the local point of presence of the data service provider to the computer of the data service provider;

causing the user computer to signal to the data service computer that the user has sent the last query to the data service provider;

processing a log-off condition of the user in response to transmission by the user of the last query; and     initiating an on-hook condition upon completion of the log-off process.

17. A programmed computer for use by a data service user with access to a public telecommunications switched network switching office having access to a local point of presence of a data service provider having a data access host computer, for minimizing the connect time between the local point of presence of the data service provider and the data service user, the programmed computer comprising:

means for causing data queries to be sent through the telecommunications switching office and the local point of presence of the data service provider to the computer of the data service provider;

means for signaling to the data service computer that the user has sent the last query to the data service provider;

means, responsive to transmission by the user of the last query, for processing a log-off condition of the user; and     means for initiating an on-hook condition upon completion of the log-off process.

18. A method for use by a data service provider with a data access host computer with a point of presence at a public telecommunications switched network switching office having access to a user of the data service having a user computer, for minimizing the connect time between the local point of presence of the data service provider and the data service user, the method comprising:

causing the data service provider host computer to receive data queries from the user;

causing the processing of the queries from the user;

recognizing a last-query signal from the user and logging the user off from access to the data service provider's computer;

recognizing that responses are available for the user queries; and     transmitting the responses to the user in response to recognition of a logged-on condition of the user.

19. A programmed host computer for use by a data service provider with a point of presence at a public telecommunications switched network switching office having access to a user of the data service having a user computer, for minimizing the connect time between the local point of presence of the data service provider and the data service user, the programmed computer comprising:

means for causing said programmed computer to receive data queries from the user;

means for causing the processing of the queries from the user;

means for recognizing a last-query signal from the user and logging the user off from access to said programmed computer;

means for recognizing that responses are available for the user queries; and     means for transmitting the responses to the user in response to recognition of a logged-on condition of the user.

\* \* \* \* \*